Jan. 17, 1961 H. M. LOEBER 2,968,255
PUMPS
Filed Jan. 31, 1958 2 Sheets-Sheet 2

Inventor
Herman M. Loeber
By
Mann, Brown and McWilliams
Attys.

United States Patent Office 2,968,255
Patented Jan. 17, 1961

2,968,255

PUMPS

Herman M. Loeber, Beatrice, Nebr., assignor to Dempster Mill Mfg. Co., a corporation of Nebraska Filed Jan. 31, 1958, Ser. No. 712,360

3 Claims. (Cl. 103—178)

This application is a continuation-in-part of my copending application Serial No. 558,079, filed January 9, 1956, now Patent No. 2,957,422.

This invention relates to pumps and particularly to pumps of the variable stroke positive displacement type adapted among other things for metering liquefied gases such as anhydrous ammonia.

Anhydrous ammonia has been widely used as a fertilizer, and in applying the fertilizer to the ground, the liquid is metered while maintained in its liquefied form, and upon discharge at a lower pressure the ammonia assumes its gaseous state and is fed to a manifold from which it is distributed to discharge nozzles located behind earth cutting implements. These earth cutting implements cut a deep furrow and the gas is discharged a considerable distance below the ground and is trapped in this location by causing the earth to fall into the narrow furrow immediately behind the earth cutting implement. The metering pump in such an instance is driven in a timed relation to a ground wheel on the fertilizing implement that is being used, and thus the uniform distribution of the fertilizer is obtained regardless of the speed of movement of the implement.

As in all pumps, metering pumps of the aforesaid character that are used for metering a liquefied gas such as anhydrous ammonia are subject to vapor lock particularly due to the vaporization of the liquefied gas.

In such pumps high working pressures are involved so that priming valves and externally accessible operating means necessarily require high pressure sealing means in association therewith so as to prevent leakage.

Another difficulty that is often encountered in such pumps is concerned with proper seating or closure of the outlet check valve.

In view of the foregoing it is the primary object of this invention to provide a pump of the aforesaid character having a simplfied and effective priming or venting means for the pump so that gas that may gather in the metering chamber may readily be discharged so as to reestablish the normal and expected metering operation of the pump. An object related to the foregoing is to provide a venting valve having manual operating means located in the low pressure portions of the pumping system.

A further and more specific object of the invention is to provide a simplified pump arrangement in which the pressure loaded outlet valve for the metering pump serves as the priming or venting valve; and a related object is to simplify the mounting and alignment of the outlet valve as well as the sealing of the venting handle which opens the same.

Other and further objects of the present invention will become apparent from the following description and claims, which by way of illustration, show a preferred embodiment of the present invention and the principles thereof, and what I now consider to be the best mode which I have contemplated applying these principles. Other embodiments of the invention embodying the same or equivalent principles may be used and structural changes may be made as desired by those skilled in the art without departing from the invention.

Figure 1:
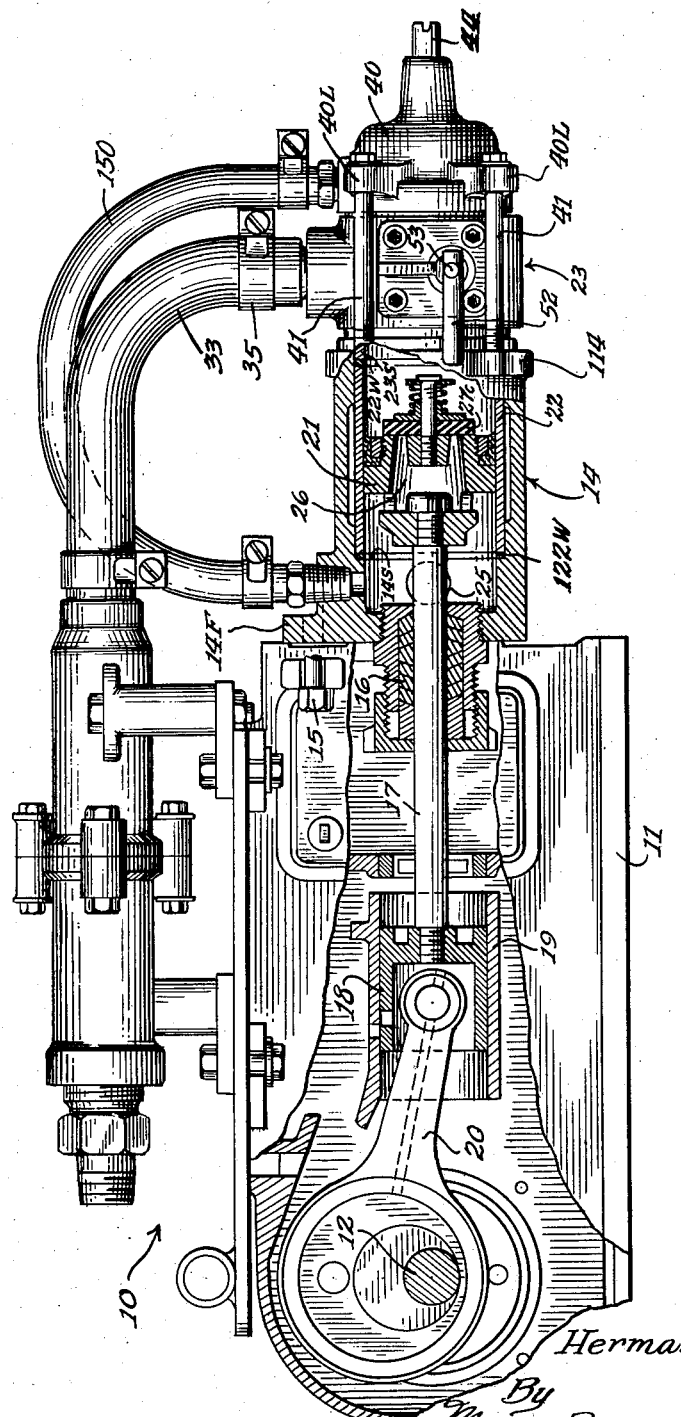
Fig. 1 is a side elevational view partially in section of a metering pump embodying the invention.

For purposes of disclosure the invention is herein illustrated as embodied in the metering pump 10 that is adapted to be mounted on a farm implement to meter a liquefied gas such as anhydrous ammonia. The metering pump 10, in most of its structural and operating characteristics, is like that shown in my aforesaid copending application, and reference is made specifically to such application for such characteristics. The pump 10 comprises a usual pump base 11 having a transverse drive shaft 12 rotatably mounted therein adjacent one end, the left hand end as viewed in Fig. 1, and at the other end of the pump base 11, a horizontally extending pump cylinder 14 is mounted. The cylinder 14 is flanged at its mounting or left-hand end as viewed in Fig. 1, such flange being identified as 14F, and the cylinder 14 is secured in position on the adjacent end of the base 11 by means of a plurality of screws 15 that cooperate with the flange 14F. The left hand or fixed end of the cylinder 14 has a threaded axial opening therein to receive a packing gland 16 through which a piston rod 17 is slidable, and its left hand or rear end as viewed in Fig. 1, the piston rod 17 is connected to a cross head 18 that is longitudinally guided on the axis of the pump cylinder by a stationary cross head guide 19. The cross head 18 is operatively connected to driving mechanism carried on the drive shaft 12 by means including a connecting link 20.

Within the cylinder 14 the connecting rod 17 has a piston 21 mounted thereon for sliding movement within a cylinder liner 22 that is located within the cylinder 14. The remote or right hand end of the cylinder 14 has a cylinder head 23 secured thereon, as will be hereinafter described, and this cylinder head 23 is arranged to embody the necessary outlet passages and to cooperate with outlet check valve mechanism as will be described.

Figure 2:
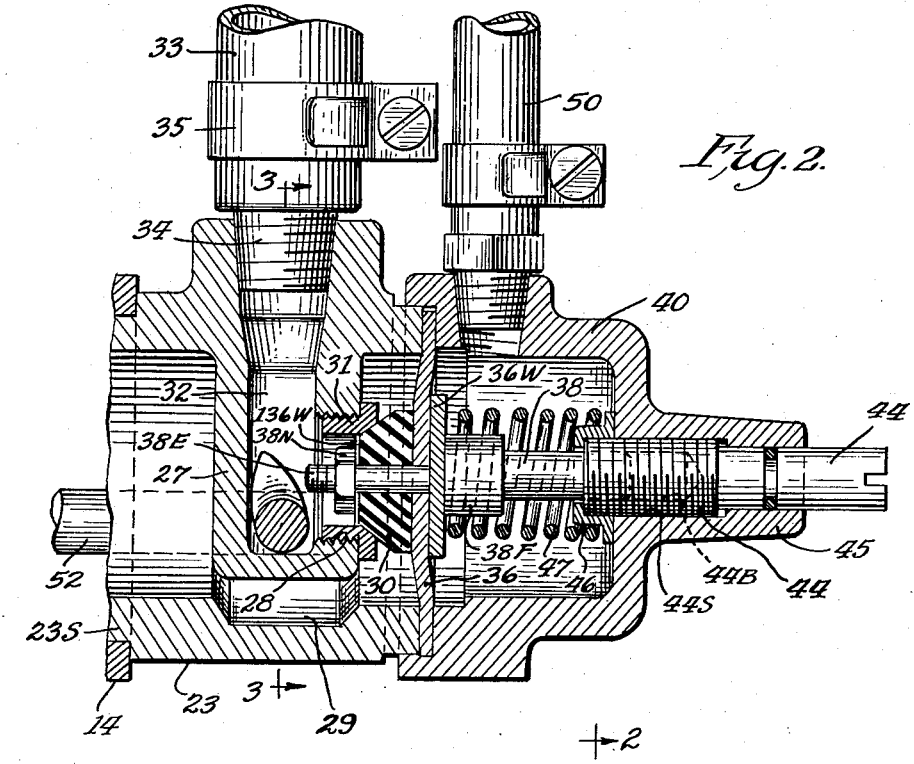
Fig. 2 is a vertical sectional view at an enlarged scale taken substantially along the line 2—2 of Fig. 3 showing the outlet check valve.

The cylinder 14, Figs. 1 and 2, has a flange 114 on the remote or right hand end of the cylinder 14 for use in securing the head 23 in position, and the head 23 has an axial flange 23S that extends into the adjacent end of the cylinder 14, and the flange 23S engages a washer 22W to press the same against the adjacent end of the cylinder liner 22. A similar washer 122W is interposed between the other end of the liner 22 and a shoulder 14S formed within the cylinder 14. Thus when the parts are assembled, as will be described, the sleeve 22 is firmly clamped in a proper sealed relation within the cylinder 14.

The liquid to be metered enters the rear or left hand end portion of the cylinder 14 through an inlet opening 25, and passes through inlet passages 26 in the piston 21 and past a spring loaded inlet check valve 27C carried by the piston 21 and into the right hand end of the cylinder 14 which constitutes the pumping space of the present pump.

The cylinder head 23 serves as a mounting upon which the outlet valve means of the pump are positioned, and for this purpose the outer or right hand end of the cylinder head 23 is formed with an annular open end, and between the two ends of the cylinder head 23 an internal cored section 27 is formed with an opening 28 in the wall thereof that is remote from the pumping chamber. The space beyond or to the right of the cored section 27 communicates through a passage 29 with the pump chamber, and liquid from the pump chamber passes through the passage 29 and flow thereof through the outlet opening 28 is controlled by an outlet valve 30. The outlet valve 30 is mounted, as will hereinafter be described, for movement on the axis of the pump chamber toward and away from a removable valve seat 31 that is threaded into the opening 28, and liquid that passes through the outlet port that is afforded by the sleeve-like valve seat 31 passes into an outlet passage 32 to a discharge hose 33 that is connected by means of a nipple 34 and a hose clamp 35 to the passage 32.

The valve 30 is of the diaphragm-operated type and under the present invention a single diaphragm 36 is employed which is associated with a valve stem 38 upon which the valve 30 is mounted. In providing a mounting for the diaphragm 36 a housing 40 is provided, the outer edge of the diaphragm 36 being clamped between the end of the cylinder head 23 and adjacent end of the housing 40. The housing 40 is held in the desired clamping relationship by a plurality of bolts 41 that extend through lugs 40L on the housing 40 and are threaded into the flange 114 that is provided on the cylinder head 23.

The valve stem 38 has an enlarged head portion 38F formed thereon intermediate its ends, and the diaphragm 36 is disposed adjacent the head 38F against a washer 36W which abuts the head 38F, and to the left of this diaphragm, as viewed in Fig. 2 of the drawings, the valve 30 is positioned on the stem 38 in abutment with the diaphragm. To the left of the valve 30, another washer 136W is located on the stem, and a nut 38N is threaded onto the threaded left hand end 38E of the stem 38 so that by tightening the nut 38N, the diaphragm 36 may be clamped in position on the valve stem 38. The washer 136W, the nut 38N and the end 38E are normally located in the outlet passage defined by the number 31, and the end 38E is located in the low pressure discharge passage 32.

At its right hand end as viewed in Fig. 2, the valve stem 38 extends slidably into a bore 44B that is formed in an axial adjusting screw 44, such adjusting screw being extended outwardly of axially through an elongated sleeve 45 formed on the housing 40, and the screw 44 being in screw-threaded engagement with the sleeve 45 as indicated at 44S in Fig. 2. At its inner end the screw 44 engages an inturned flange of a spring-cup 46 so that by inward adjustment of the screw 44 the cup 46 may be moved toward the diaphragm 36, and this is utilized to adjust a compression of a coil spring 47 that surrounds the valve stem 38 within the housing 40 and acts between the spring-cup 46 and the adjacent washer 36W so as to urge the valve 30 toward its closed position.

The housing 40 is connected to the pump cylinder 14 at a point adjacent to the inlet 25 and this is accomplished by means of a hose connection 150. Thus the pressure of the fluid within the housing thus acts on the diaphragm 36 so as to augment the closing force applied to the valve 30 by the spring 47.

With the valve arrangement that is thus provided, the valve 30 is actuated to its open position by the pumping pressures that are built-up in the cylinder 14 and such pressures are applied to the left hand face of the diaphragm 36 and to the exposed left hand surfaces of the valve member 30. Such valve opening forces are opposed by the hydraulic pressure applied to substantially the entire area of the right hand side of the diaphragm plus the forces applied by the spring 47. Thus, during the time when the pumping chamber is being filled, there is a great excess of the valve closing forces over the valve opening forces that are applied by the pressure of the incoming liquid, and it is only after there has been a very substantial increase in the pressure in the pumping chamber that the valve 30 is opened by its operating diaphragm 36.

With the diaphragm operated-check valve that is thus provided, the attainment of proper alignment of the various parts is materially simplified, and many parts are eliminated as compared with the prior two-diaphragm arrangement shown in my aforesaid application. It will be observed that the valve 30 and the valve seat 31 have conical engaging surfaces, while the valve stem 38 is slidable in the guide bore 44B. Thus, in assembly of the structure, the valve member 30 may be engaged with the conical valve seat 31 while the housing 40 and diaphragm 36 are moved toward the cylinder head preparatory to the clamping of the diaphragm edge between the housing 40 and the cylinder head. As this is done, the diaphragm 36 assumes its proper relationship transversely of the axis of the housing 40 and cylinder head 23 so that when the final clamping of the parts has been completed, the valve assembly may be easily actuated back and forth to open and close the outlet, and in such movements there will be no undesired lateral stresses upon the moving parts. As a result of this arrangement, valve assembly is relatively easy to align and locate during the assembly operations, and has been found to have a long trouble-free, useful life.

It will be apparent of course to those skilled in the art that the operation of the pump as a metering pump is dependent upon the premise that all of the passages are continually filled with liquid, but since there is always a possibility that the pump may become vapor-locked when undue reduction of pressure or undue increase of temperature causes bubbling of the liquid, it is necessary to provide venting means for venting the gas from the pump chamber so as to thereby prime and pump. Under the present invention this is accomplished by utilizing the outlet check valve 30 as a venting means, and under the present invention this is accomplished in such a way as to avoid the necessity for using two spaced diaphragms as were required in the structure shown in my aforesaid application.

Broadly considered, the present invention accomplishes the required opening of the outlet check valve 30 by manually operable means that are located in what may be termed the low pressure portion of the pumping system. More specifically, such manual operable valve opening means are located primarily within the outlet passage 32 and cooperate in this low pressure zone with the end 38E of the valve stem, and the external valve operating means and portions extending outwardly from or through the cylinder head 23 may be mounted with the minimum of packing and sealing since the actuating means are located in the low pressure zone or portion of the system.

Figure 3:
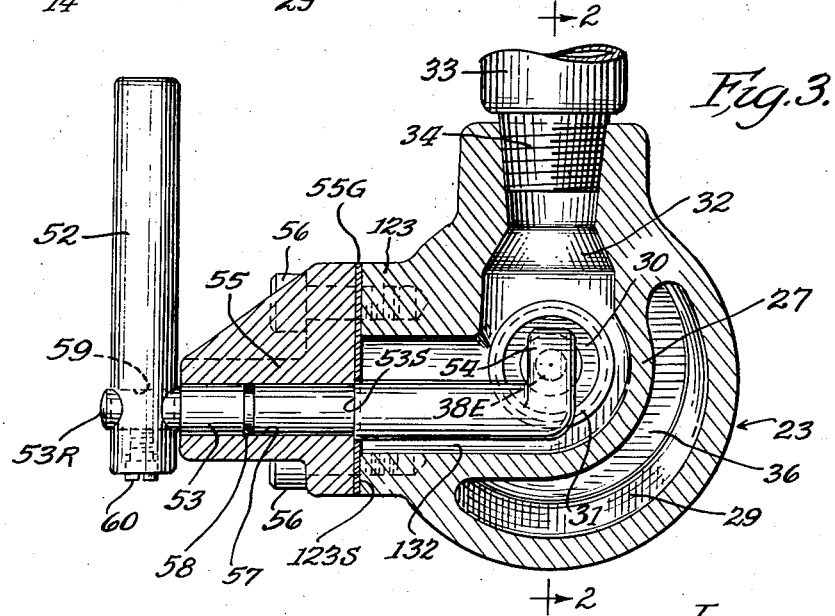
Fig. 3 is a cross sectional detail of the outlet check valve taken along the line 3—3 of Fig. 2.

Thus, as shown in Figs. 2 and 3, such manual valve opening force may readily be applied in the present structure by means of a vent lever 52 that is located at one side of the cylinder head 23 and is fixed on the outer end of a horizontal rock shaft 53 which extends into the passage 32. At its inner end the rock shaft 53 has an upwardly projecting arm 54 that is arranged for engagement with the end 38E of the valve stem 38, and by rocking the lever 52 in a clockwise direction, as viewed in Fig. 2, the outlet check valve 30 may be opened at will to vent gas from the pump chamber. Such gas of course is forced from the chamber by the pressure of the incoming liquid and the pump is thus primed.

The valve operating shaft 53 may be conveniently mounted and sealed since it extends into the low pressure outlet passage 32. Thus the cored section 27 of the cylinder head 23 is formed to provide a horizontal extension passage 132 from the passage 32, as shown in Fig. 3, and the horizontal passage 132 opens through a flat vertical surface 123S of a pad 123 formed on the side of the cylinder head. The end of the passage 132 is closed by a bearing casting 55 that is gasketed at 55G and clamped against the surface 123S by cap screws 56.

The bearing plate or casting 55 has a relatively long horizontal bore 57 formed therethrough to receive and rockably support the shaft 53, and the shaft is shouldered at 53S to engage the inner face of the casting 55. The shaft 53 is inserted through the inner face of the casting 55, and has an O ring seal 58 with the bore 57. The handle 52 has a transverse bore 59 therein at one end to embrace a reduced end 53R of the shaft 53, and a set screw 60 through the end of the handle engages the reduced end 53R to fix the handle 52 in the desired rotative and axial position on the shaft 53. The handle 52 and the shoulder 53S serve to hold the shaft 53 in such an axial position that the arm 54 will engage the stem 38E when the shaft 53 is rocked, and the shaft 53 is located substantially below the center line of the stem 38E so that the arm 54 has sufficient effective length to impart the required opening movement to the valve 30.

From the foregoing description it will be apparent that the present invention provides an improved outlet check valve structure for anhydrous ammonia pumps, and it will also be evident that this outlet check valve structure may be readily and easily put into its assembled position on the pump and when thus assembled will operate satisfactorily and without undue trouble and wear in the fields.

It will also be evident that the outlet check valve structure of the present invention has a new and improved manual opening means associated therewith so that the outlet check valve may be operated as a vent or priming valve. It will also be apparent that under the present invention the manual operating means are disposed in association with the low pressure side of the system so that the minimum of sealing may be employed.

Thus while I have illustrated and described a preferred embodiment of my invention it is to be understood that changes and variations may be made by those skilled in the art without departing from the spirit and scope of the appending claims.

I claim:

1. In a liquid metering apparatus for measuring high pressure liquefied gas and discharging the same to a zone of lower pressure, a piston and cylinder pump having an inlet valve and including a cylinder having a cylinder head, said cylinder head having an axial outlet port formed therein and having a conical valve seat formed in said port and facing away from said cylinder, a valve for said port having a conical seating surface on one face for engaging with said seat and having a mounting surface on its opposite face, a diaphragm secured on said valve against said mounting surface, a spring housing of cuplike form having a cross wall forming the bottom of the cup and also having an open end edge clamping the border of said diaphragm against said cylinder head with the conical seating surface of the valve opposed to and aligned with said valve seat, a valve stem axially connected to said diaphragm and having a projecting end located axially within said housing between said cross wall and said diaphragm, means in said housing guiding said end along the axis of said outlet port, a valve-closing spring in said housing surrounding said stem and acting between the cross wall and the diaphragm to urge the valve to closed position, and manual valve-opening means extending into the space on the outlet side of said outlet port for applying valve-opening movement to said valve.

2. In a liquid metering apparatus volumetrically measuring high pressure liquefied gas and discharging the same to a zone of lower pressure, means defining an expansible chamber pump having an inlet check valve and including a cylinder having a cylinder head, said head for said chamber having an axial outlet port formed therein with a valve seat formed in said port at the end thereof that is remote from said chamber and facing away from said chamber and having a lateral discharge passage extending from said port, a valve for and in opposed relation to said port and having an axial valve stem, a diaphragm secured on said stem beyond said remote end of said port, a spring housing clamping the border of said diaphragm against said cylinder head, means in said housing guiding said stem for sliding valve-opening and closing movements, a valve closing spring in said housing and acting on said stem to close the valve, said head having a lateral clearance passage therein extending in the general plane of and opening into the lateral discharge passage, a bearing plate closing the end of the clearance passage, and manual valve opening means including an operating shaft extending through said plate and through said clearance passage into said lateral discharge passage and being rotatable for applying valve opening movement to said valve, and a low pressure seal in said bearing plate surrounding said shaft.

3. In a liquid metering apparatus volumetrically measuring high pressure liquefied gas and discharging the same to a zone of lower pressure, means defining an expansible chamber pump having an inlet check valve and including a cylinder having a cylinder head, said head for said chamber having an axial outlet port formed therein with a seat formed in the port and facing away from said chamber and having a discharge passage extending from said port, said discharge passage having a lateral clearance passage extending therefrom through one side of said head, a valve for said port disposed for cooperation with said valve seat and having a valve stem extended away from said seat on the outlet side of said port, a diaphragm secured on said stem, a spring housing clamping the border of said diaphragm against said cylinder head with one side of the diaphragm exposed to pump pressure and the other side of the diaphragm exposed within said spring housing, means in said housing guiding said stem for sliding valve-opening and closing movements, a valve closing spring in said housing and acting on said stem to close the valve, a closure plate removably clamped on said one side of said head in sealing relation over the end of said clearance passage, a rock shaft extending rotatably through said plate in sealed relation, an arm on the inner end of said shaft for applying valve-opening movement to said valve when said shaft is rocked, and a handle secured on the outer end of said shaft.

References Cited in the file of this patent

UNITED STATES PATENTS

| | | |
|---|---|---|
| 2,458,230 | Warcup | Jan. 4, 1949 |
| 2,647,538 | Demay | Aug. 4, 1953 |
| 2,696,785 | Blue | Dec. 14, 1954 |
| 2,761,391 | Johnston | Sept. 4, 1956 |
| 2,771,846 | Horton et al. | Nov. 27, 1956 |
| 2,811,108 | Horton et al. | Oct. 29, 1957 |
| 2,836,119 | Kugler | May 27, 1958 |